2,728,732
Patented Dec. 27, 1955

2,728,732

MODIFIED SILICA POWDERS HAVING ORGANOPHILIC PROPERTIES AND THEIR PREPARATION

Lyda M. Arnett, Jr., Wilmington, Del., Max F. Bechtold, Kennett Square, Pa., and Richard E. Benson, Claymont, Del., assignors to E. I. du Pont de Nemours & Company, Wilmington, Del., a corporation of Delaware No Drawing. Application January 25, 1952,
Serial No. 268,354

21 Claims. (Cl. 252—383)

This invention relates to modified silica powders and more particularly to organophilic silica powders and to methods for their preparation.

Finely divided silica is useful in many applications, e. g., in the textile industry where it is useful in imparting frictional effects on fibers and fabrics and as a modifier for sizes, binders, and coatings. However, it is not suitable in some applications because of its organophobic characteristics. Consequently, organophilic silica powders are desired for use in these particular applications.

It is an object of this invention to provide new modified silica powders and methods for their preparation. A further object is to provide silica powders having organophilic properties and methods for their preparation. Other objects will appear hereinafter.

These objects are accomplished by the following invention of organophilic silica powders comprising the reaction product of active fractured silica particles with a polymerizable ethylenic compound, said reaction product having an organic component resulting from the polymerizable ethylenic compound chemically bonded to the silica particles through silicon-carbon bonds, the silica particles containing said chemically bonded organic component in amount by weight equivalent to 0.05 to 5.0% carbon. It has now been found that organophilic silica powders can be prepared by grinding silica to fine particles to provide active fractured silica surfaces, bringing the fractured silica surfaces while still active into contact with a polymerizable ethylenic monomer, mixing said active fractured silica particles in intimate contact with said ethylenic monomer, and separating therefrom an organophilic silica product containing from 0.05 to 5.0% carbon.

A preferred manner of carrying out the process of this invention comprises grinding amorphous silica, e. g., fused silica, particles having a size range of about 4 to 8 mesh (Tyler standard screen sieve scale) in a ball mill with an amount of a polymerizable ethylenic compound, e. g., styrene, until particles of the desired size are obtained. Grinding times ranging from 7 to 100 hours are suitable for obtaining silica powders of sizes ranging from 60 microns to 0.4 micron weight median diameter. The grinding operation is carried out at a temperature below that causing appreciable addition polymerization of the ethylenic monomer employed. Operable temperatures range from −70° to 50° C. The exact temperature employed in any particular case depends on the particular ethylenic compound being used and on whether a stabilizer (i. e., a compound which inhibits addition polymerization) is present. Higher temperatures can be used when a stabilizer is present, than when no stabilizer is used.

The amount of polymerizable ethylenic compound employed in this embodiment of the process of this invention is not critical. Preferably, an amount of ethylenic compound sufficient to cover the silica and the pebbles or other grinding aid in the ball mill is used in order to obtain efficient grinding action.

The powdered modified silica and excess ethylenic compound are separated from the grinding aid, i. e., the pebbles or cylinders employed in the ball mill, by decantation or filtration. In some cases it is desirable to add an organic solvent, e. g., benzene, to the reaction mixture and then separate the silica and organic solvent containing excess ethylenic compound from the grinding aid. The silica powder is conveniently separated from the excess ethylenic compound (and any solvent which may have been added) by filtering or centrifuging, the particular method selected depending on the particle size of the product. With coarse silica powders filtration is satisfactory, but with the more finely divided silica powders centrifugation is preferred. The separated silica powder is then washed with an organic solvent, e. g., hot benzene, centrifuged, and the washing and centrifuging process repeated one or more times. The washed silica powder is then dried, preferably in a vacuum oven at elevated temperature, e. g., 80–110° C. The resulting organophilic silica powder is suitable for use in various applications in which finely divided silica has heretofore been employed.

Although this embodiment of the process of this invention is preferably carried out in an inert atmosphere, this is not essential as the formation of organophilic silica powders by grinding silica in the presence of an ethylenic compound can be accomplished in an atmosphere of air.

In another embodiment of this invention the silica is ground in a ball mill in the presence of the vapor of the ethylenic compound. This embodiment is particularly useful when low-boiling polymerizable ethylenic compounds, e. g., tetrafluoroethylene, are employed as the modifier of the silica. In this modification, the organophilic silica powder obtained is easily separated from excess ethylenic compound by vaporization of the latter.

The time of grinding of the silica in the presence of the ethylenic polymerizable compound can be varied over wide limits. The actual time employed in any given case depends largely on the final size of organophilic silica particles desired. In general, the longer the time of grinding the finer are the particles that are obtained. However, extremely long times of grinding in a ball mill do not produce a corresponding decrease in particle size. Generally periods ranging from 6 to 100 hours are capable of producing organophilic silica powders having particle sizes in the range from 60 microns down to 0.4 micron weight median diameter, i. e., 50%, by weight, of the particles have a diameter less than the specified value, and 50% have a diameter greater than the specified value.

In still another embodiment of this invention the process is carried out in two steps. The first step comprises grinding silica to the desired particle size, e. g., to a particle size within the range of 0.4 to 60 microns weight median diameter, in any of the conventional types of mills capable of grinding solid particles to this particular size range, e. g., a ball mill, a high speed hammer mill, or an air attrition mill, such as of the type known commercially as a "Micronizer." This grinding step is carried out in the absence of any organic compounds, but preferably is conducted in a dry, inert atmosphere, e. g., in an atmosphere of helium or nitrogen. While the grinding step of this invention can, if desired, be carried out in the presence of air, the silica surface thus fractured in air must be contacted with the organic compound sooner than if the grinding is carried out, and the resulting powder stored, in an inert atmosphere, since the presence of moisture in the atmosphere reduces the reactivity of the fractured silica surface to the polymerizable ethylenic monomer used in the second step of this invention.

After the silica has been reduced to the desired particle size, it is contacted with the ethylenic monomer, e. g., styrene, at ordinary or slightly elevated temperatures, e. g., 25–60° C. The ethylenic compound reacts with the freshly fractured silica surfaces of the powder to form organophilic silica powders. The resulting modified silica powder is separated from the excess ethylenic compound by conventional means, e. g., by filtration or by centrifugation as described previously.

When this two-step embodiment of the process of this invention is used, it is essential that the ground silica be contacted with the organic compound before the activity of the freshly fractured surfaces is lost. The exact length of time that the ground silica retains its activity depends on the conditions of grinding and the conditions under which the powder is stored. In general, the ground silica retains its activity longer when it is ground and stored in a dry, inert atmosphere than when it is ground and stored in a moist atmosphere. For example, silica ground in a ball mill under helium and then stored in air at 25° C. and 50% relative humidity retains its activity to styrene for only a few hours. Silica powder ground in this manner shows very little reactivity to styrene after seven hours and essentially no reactivity after twenty-four hours under the same conditions. On the other hand, the same type of silica ground in an atmosphere of helium, and stored under helium or under vacuum retains good activity to styrene for periods of 260 hours and longer. Best results are obtained when the silica is ground to the desired particle size and immediately placed in contact with the ethylenic compound with which it is to be reacted.

The treatment of the finely ground silica with the polymerizable ethylenic compound can be carried out under a variety of conditions. The reaction takes place satisfactorily at ordinary temperatures, e. g., 25° C., but it can be carried out, if desired, at slightly lower or higher temperatures, e. g., from 10° to 60° C. The silica powder is contacted with the ethylenic compound for periods of time ranging up to 24 hours or more. Satisfactory results are obtained with contact times of 16 to 24 hours. However, contact times of only 1 hour or more than 24 hours can be used if desired. As in the cases of the other embodiments of this invention, the amount of the ethylenic compound employed is not critical. In general, an amount of ethylenic monomer sufficient to provide good wetting of the silica powder and good agitation of the mixture is used.

The silica powders produced by the process of this invention contain chemically bonded organic material equivalent to 0.05 to 5.0% carbon. Those containing 0.1% to 5.0% carbon are organophilic. They retain their organophilic characteristics after thorough extraction with organic solvents and retain a large portion of their organophilic properties after refluxing in boiling water for one day and longer. The resistance to hydrolysis of the silica powders of this invention indicates that the silica particles are bound to the ethylenic compound with which they are reacted by means of carbon-silicon bonds.

Since it is the freshly formed surface of a silica particle that is reactive with a polymerizable ethylenic monomer in the process of this invention, best results are obtained when a form of silica which is easily fractured is used, for example hard, dense silicas, such as fused silica and quartz. The finer these silicas are ground the larger will be the number of freshly formed surfaces. Consequently the finer particles, on a weight basis, will combine with more of the ethylenic monomer than coarser particles. Therefore in a modified freshly fractured silica powder of any given average particle size and carbon content made by the process of this invention the individual finer particles making up the composite powder will have a higher carbon content than the individual coarser particles in the powder.

As indicated above, the preferred types of silica for use in the process of this invention are the hard, dense, easily grindable silicas such as fused silica and quartz. However, the softer, more porous silicas such as silica aerogel can be used. With such porous silicas, which are composed of aggregates of very fine particles, the grinding step primarily results in the separation of the aggregates into the individual particles, with only a few of the individual particles being fractured. Nevertheless, the freshly fractured surfaces react with the ethylenic monomer to produce modified silicas.

A stabilizer, i. e., a compound which inhibits addition polymerization of ethylenic compounds, is preferably employed in the process of this invention, although it is not essential. The stabilizer reduces the amount of polymerization of the ethylenic compounds outside the system, that is, it reduces the amount of polymer which is not chemically joined to the silicon atoms of the silica. Examples of conventional polymerization inhibitors or stabilizers that can be used include hydroquinone, pyrogallol, catchol, tert.-butylcatechol, beta-naphthol, copper resinate, napththylamines, and other antioxidants.

The process of this invention is illustrated in further detail by the following examples, in which the proportions of ingredients are expressed in parts by weight unless otherwise specified.

*Example I*

A porcelain ball mill is filled approximately one-half full with flint pebbles and charged with 200 parts of fused silica of 4 to 8 mesh particle size and 162.5 parts of stabilized styrene. The mill is flushed with nitrogen and rotated at room temperature, i. e., at about 25° C., for 66 hours. Hot benzene (about 200 parts) is added to the reaction mixture and after being thoroughly agitated the mixture is decanted from the pebbles. The benzene suspension is centrifuged, the supernatant liquid discarded, and the product resuspended in about 300 parts of hot benzene and separated again by centrifuging. This process is again repeated and the solid product obtained is allowed to air dry for 12 hours and finally dried in a vacuum oven at 110° C. for 24 hours.

The product contains 0.74% carbon and 0.26% hydrogen. (All analytical data given in this and the following examples are averages of duplicate determinations.) This silica powder is largely hydrophobic and is completely organophilic to benzene. It has a surface area of 3.6 m.$^2$/g., on the basis of nitrogen adsorption tests, which is equivalent to 0.76 micron weight median particle diameter. Dye area measurements indicate that 1.5 m.$^2$/g. of the surface is hydroxylated.

A portion of the product of Example I is extracted with benzene in a Soxhlet extractor for 72 hours. The product is dried in a vacuum oven at 110° C. This extracted silica powder contains 0.72% carbon and 0.16% hydrogen, and is still completely organophilic to benzene.

Another portion of the silica powder of Example I is heated in boiling water for 24 hours and then dried at 130° C. This product contains 0.28% carbon and 0.35% hydrogen, and is almost completely organophilic to benzene.

The organophilic and hydrophobic characteristics of the silica powders of this invention are based on the partitioning of the product between water and an immiscible organic liquid, particularly benzene or 1-butanol. In this test a small portion of the finely divided silica powder is placed in a glass container and a small volume of water added to it. After agitating the mixture, it is observed. If the powder is wet by the water it is hydrophilic, and if not, it is hydrophobic. A small portion of water immiscible liquid, e. g., benzene, is then added to the container and the mixture agitated briskly again. If the silica powder remains suspended in the aqueous layer, it is organophobic. However, if the silica powder is suspended in the organic layer and none of it is in the aqueous layer, it is completely organophilic. In some cases particles of organophilic silica settle at the interface between the water and the organic liquid.

*Example II*

A mixture of 50 parts of fused silica (4 to 8 mesh), and 22.6 parts of stabilized styrene is placed in a heavy walled glass container filled to about half its volume with a dense cylindrical grinding medium instead of flint pebbles which is then rotated at room temperature for 18 hours. The silica powder is separated from the grinding medium and excess styrene as in Example I, and then dried at 140° C. in a vacuum oven.

This modified silica powder contains 0.34% carbon and 0.19% hydrogen, and is hydrophobic and completely organophilic to benzene. Microscopic examination of the powder indicates it to have a weight median diameter particle size of 17.6 microns.

*Example III*

A porcelain container about half filled with a dense cylindrical grinding medium is charged with a mixture of 60 parts of fused silica (4 to 8 mesh), and about 90 parts of alpha-methylstyrene and rotated for 48 hours.

The product is isolated as in Example I and is found to contain 1.09% carbon and 0.17% hydrogen. This alpha-methylstyrene-modified silica powder is completely organophilic to benzene and is largely hydrophobic.

*Example IV*

A porcelain ball mill is charged with about half its volume of a dense cylindrical grinding medium, 101 parts of acrylonitrile containing hydroquinone stabilizer, and 100 parts of fused silica (4 to 8 mesh), and the mixture ground for 66 hours at room temperature. At the end of this time warm dimethylformamide (about 200 parts) is added to the mixture and the suspension separated from the grinding medium. This mixture is centrifuged, the supernatant liquid discarded, and the product resuspended in hot dimethylformamide and separated by centrifuging. This process is repeated and the resulting product is allowed to air dry for 12 hours and finally is dried at 100° C. in a vacuum oven.

This acrylonitrile-modified silica powder contains 0.12% carbon and 0.09% hydrogen, and is largely hydrophilic and is slightly organophilic to 1-butanol.

*Example V*

A ball mill containing about half its volume of a dense cylindrical grinding medium is charged with 50 parts of silica (4 to 8 mesh) and 38 parts of stabilized 2-methyl-5-vinylpyridine, flushed with nitrogen, and the mixture ground for 66 hours at room temperature. The resulting mixture of modified silica and excess methylvinylpyridine is separated from the grinding medium by decantation, suspended in benzene, and then filtered. The filtrate is discarded and the solid residue is extracted with hot acetone and finally dried in a vacuum oven at 110° C.

This methylvinylpyridine-modified silica powder is hydrophilic and partially organophilic to benzene. It contains 0.12% carbon and 0.15% hydrogen. Microscopic particle size determination indicates a weight median particle diameter of 7.4 microns.

*Example VI*

A glass container about half filled with flint pebbles is charged with 110 parts of fused silica (4 to 8 mesh), purged three times with nitrogen and finally purged with butadiene. The glass vessel is then cooled with a mixture of solid carbon dioxide and acetone and approximately 50 parts of butadiene distilled into the mixture. The closed container is rotated for 7 hours at a temperature ranging from −70 to −30° C. At the end of this time, excess butadiene is allowed to distill from the reaction vessel at room temperature and the reaction product is suspended in hot benzene. After decantation from the flint pebbles the benzene suspension is filtered and the filtrate discarded.

The resulting butadiene-modified silica powder is dried and is found to be somewhat hydrophobic and somewhat organophilic to benzene. It contains 0.25% carbon and 0.12% hydrogen.

*Example VII*

A ball mill containing about half its volume of a dense cylindrical grinding medium is charged with 50 parts of fused silica (4 to 8 mesh) and 38.3 parts of chloroprene containing phenothiazine stabilizer, purged with nitrogen and rotated for 40 hours at room temperature. After separating from the grinding medium, the silica product is suspended in benzene, filtered, and dried in a vacuum oven at 110° C.

This chloroprene-modified silica powder contains 0.26% carbon and 0.19% hydrogen, and is largely organophilic to toluene. A microscopic particle size determination indicates a weight median diameter of 6.3 microns.

*Example VIII*

A porcelain ball mill containing about half its volume of a dense cylindrical grinding medium is charged with a mixture of 141 parts of quartz (almost completely crystalline silica) and 108.4 parts of stabilized styrene, flushed with nitrogen, and rotated for 66 hours at room temperature. At the end of this time an additional 18.1 parts of styrene is added and grinding continued for another 24 hours. After separating from the grinding medium, the mixture of modified silica powder and excess styrene is centrifuged. The solid product is extracted twice with hot benzene and dried in a vacuum oven at 110° C.

This styrene-modified quartz powder contains 1.44% carbon and 0.25% hydrogen. A microscopic examination of the powder indicates a weight median diameter particle size of 4.4 microns.

A portion of the styrene-modified silica of Example VIII is extracted with benzene in a Soxhlet extractor for 24 hours. After this treatment the product contains 0.93% carbon and 0.13% hydrogen, and is completely organophilic to benzene.

Another portion of the styrene-modified silica of Example VIII is heated in boiling water for 24 hours and then allowed to air dry. This product contains 1.01% carbon and 0.17% hydrogen, and is completely organophilic to benzene and is almost completely hydrophobic.

*Example IX*

A ball mill is charged with about half its volume of a dense cylindrical grinding medium, 100 parts of fused silica (4 to 8 mesh), and 97.4 parts of methyl acrylate containing 0.1 part of hydroquinone stabilizer, flushed with nitrogen, and the mixture ground for 66 hours. The modified silica and excess methyl acrylate is suspended in acetone and centrifuged.

The resulting methyl acrylate-modified silica powder contains 0.21% carbon and 0.11% hydrogen.

*Example X*

A ball mill containing about half its volume of flint pebbles is charged with 100 parts of silica (4 to 8 mesh) and 135.5 parts of stabilized styrene and rotated for 70 hours. After separating the reactants from the pebbles, the mixture of silica powder and excess styrene is suspended in benzene and then centrifuged. The resulting styrene-modified silica powder, after drying in a vacuum oven at 110° C., is found to contain 0.91% carbon and 0.14% hydrogen.

Nitrogen adsorption tests indicate this powder has a surface area of 6.5 m.$^2$/g., corresponding to a weight median particle diameter of 0.42 micron. This product is largely hydrophobic and completely organophilic to benzene.

A portion of the product of Example X is extracted with benzene in a Soxhlet extractor for 24 hours. The resulting silica powder, after drying in a vacuum oven, contains 0.83% carbon and 0.15% hydrogen. This product is also largely hydrophobic and completely organophilic to benzene.

Another portion of the product of Example X is heated in boiling water for 24 hours. The silica powder is removed by filtration, washed with acetone, and air-dried. The dry product is extracted with benzene and then dried in a vacuum oven at 110° C. This final silica powder contains 0.75% carbon and 0.16% hydrogen, and is largely hydrophobic and completely organophilic to benzene.

*Example XI*

A porcelain ball mill is charged with a dense cylindrical grinding medium, 103 parts of dimethylaminoethyl methacrylate and 100 parts of fused silica (4 to 8 mesh) and rotated for 48 hours. After separating the reaction mixture from the grinding aid the mixture is suspended in warm benzene and centrifuged. The resulting modified silica powder is dried in a vacuum oven at 110° C. It contains 0.35% carbon and 0.13% hydrogen. This product is somewhat organophilic to benzene.

*Example XII*

A glass ball mill is charged with approximately one-half its volume of flint pebbles and with 80 parts of fused silica of 4 to 8 mesh (Tyler standard screen sieve), flushed out with helium, and then rotated for 19 hours. The grinding action is stopped and after one hour a portion (about 5 parts) of the resulting ground silica is added to a container with about 10 parts of stabilized styrene, the air in the container swept out with helium, and the closed container agitated for 24 hours at room temperature, i. e., at about 25° C. This agitation provides intimate mixing of the silica with the styrene, but does not produce any reduction in the particle size of the silica. At the end of this time the silica powder is separated from the excess styrene by filtration, extracted twice with about 30 parts of benzene and dried in a vacuum oven at 110° C. The silica powder contains 0.26% carbon and 0.17% hydrogen (average of duplicate determinations) and is completely organophilic to benzene.

Similarly, other samples of the silica powder stored for 120 hours and 260 hours, respectively, under helium and then reacted with styrene for 24 hours under helium as described above are largely organophilic to benzene. Analysis of the untreated ground silica indicates that it contains less than 0.05% carbon.

A portion of the silica powder obtained in the first step of Example XII is exposed to moist air for 24 hours and then added to a small glass container containing styrene. After agitating the styrene and silica powder mixture for 24 hours at room temperature, the silica powder is isolated by filtration. The resulting dry powder is not organophilic. This shows that the silica powder loses its reactivity on exposure to moist air for 24 hours.

*Example XIII*

Quartz is ground under helium in a ball mill in the manner described in the first step in Example XII. A sample of this silica stored one hour under helium is treated with about 10 parts of stabilized styrene, the air in the container again swept out with helium and the closed container agitated for 24 hours at room temperature, i. e., at about 15° C. The silica powder is then separated from excess styrene by filtration, washed twice with benzene and dried in a vacuum oven at 110° C. This modified silica powder contains 0.09% carbon and 0.07% hydrogen. This product is almost completely organophilic to benzene. A sample of the ground silica which has been stored 240 hours under helium and then treated with styrene in the same manner is almost completely organophilic to benzene.

*Example XIV*

Fused silica of 4 to 8 mesh particle size is ground in a high speed hammer mill during a period of about ½ to 1 minute to pass a standard screen having 0.010 inch openings. The finely divided silica powder is allowed to fall directly into stabilized styrene. The suspension of silica powder in styrene is agitated in a closed container overnight (about 18 hours), the silica being covered by the styrene which is exposed to the air in the container. The silica powder is removed by filtration, extracted with benzene and allowed to air-dry. The dry silica powder contains 0.06% carbon and 0.07% hydrogen, and is somewhat organophilic to 1-butanol.

The modified silica of Example XIV is screened through a 325-mesh Tyler standard screen, with 36.6% of the powder being retained on this screen. Microscopic analysis of the powder passing through the screen indicates it to have a weight median particle diameter of 20.2 microns.

*Example XV*

Fused silica of 4 to 8 mesh particle size is ground under helium in a ball mill as described in Example XII. Portions of the ground silica are then placed in glass containers and exposed to an atmosphere of air at 25° C. and 50% humidity. After exposure under these conditions for periods of time ranging from 1 to 7 hours, the samples are treated with styrene and agitated for 24 hours. During this period the silica is under the surface of the liquid styrene, but the styrene is exposed to the atmosphere. After isolating and drying the treated silica powder in the manner described in Example XII, all the samples of modified silica are found to be reactive to styrene as indicated by the resulting powders being somewhat organophilic to benzene. The sample held for 7 hours at 25° C. and 50% humidity, however, is only slightly organophilic.

In addition to the polymerizable ethylenic compounds which are mentioned in the examples, all of which contain terminal ethylenic unsaturation any other such compounds, particularly those containing from 1 to 2 ethylenic double bonds as the sole aliphatic carbon-to-carbon unsaturation, can be reacted with freshly fractured silica in the process of this invention to produce organophilic silica powders. Specific examples of other polymerizable ethylenic compounds which can be used include mono-olefins, e. g., ethylene and isobutylene; halogenated ethylenes, e. g., tetrafluoroethylene; conjugated dienes, e. g., butadiene and isoprene; vinyl esters, e. g., vinyl acetate, vinyl chloride and vinyl fluoride; vinylidene compounds, e. g., vinylidene chloride; esters of alpha-methylenemonocarboxylic acids, e. g., methyl methacrylate and isobutyl methacrylate.

The silica used in the process of this invention can be either amorphous or crystalline silica. Fused silica, an example of the amorphous type, is very satisfactory and quartz, an example of crystalline silica, is also suitable. Silica suitable for use in the process of this invention can be granular types commonly available. Granular silica having a particle size of 4 to 8 mesh (Tyler standard screen sieve) is very satisfactory; however, larger or somewhat smaller sizes can be used if desired.

The type of grinding equipment used in the process of this invention is not critical. Conventional ball mills constructed of glass, porcelain, or other materials of construction inert to the material being ground are satisfactory. The grinding aid used in the ball mills can be ordinary flint pebbles, or any dense cylindrical grinding aid, such as that sold commercially under the name "Burundum." In addition to conventional ball mills, steel containers capable of being rocked or shaken and charged with the silica and ethylenic compound in the presence of a grinding aid can also be employed.

The products of this invention are useful in the many applications in which finely divided silica is now employed, e. g., as anticaking agents for various powders such as insecticides, dyes, etc., and as pigment extenders, flatting agents, insecticide diluents, etc. They are particularly useful, because of their organophilic properties, as additives for rubber and pigments.

As many apparently widely different embodiments of this invention may be made without departing from the spirit and scope thereof, it is to be understood that the invention is not limited to the specific embodiments thereof except as defined in the appended claims.

We claim:

1. A method for preparing a modified silica powder having organophilic properties which comprises grinding and fracturing a hard, dense silica selected from the class consisting of fused silica and crystalline silica to fine particles within the range of 0.4 to 60 microns weight median diameter and having active fractured silica surfaces, while said silica surfaces are still active mixing and intimately contacting said active fractured silica particles with a polymerizable ethylenic monomer in amount by weight equivalent to at least 0.1% carbon and at a temperature below that at which polymerization of said monomer occurs, thereby causing said polymerizable ethylenic monomer to become chemically bonded through carbon thereof to silicon at the active fractured silica surfaces, and separating as the resulting product a modified silica powder having organophilic properties.

2. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and having active fractured silica surfaces, maintaining said active fractured silica surfaces in contact with an inert atmosphere for a period of not more than 260 hours, immediately thereafter mixing and intimately contacting under an inert atmosphere said active fractured silica particles with a polymerizable ethylenic monomer in amount by weight equivalent to at least 0.1% carbon and at a temperature below that at which polymerization of said monomer occurs, thereby causing said polymerizable ethylenic monomer to become chemically bonded through carbon thereof to silicon at the active fractured silica surfaces, and separating as the resulting product a modified silica powder having organophilic properties.

3. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and having active fractured silica surfaces, maintaining said active fractured silica surfaces in contact with an inert atmosphere for a period of not more than 7 hours, immediately thereafter mixing and intimately contacting said active fractured silica particles with a polymerizable ethylenic monomer in amount by weight equivalent to at least 0.1% carbon and a stabilizer therefor against addition polymerization, at a temperature below that at which polymerization of said monomer occurs, thereby causing said polymerizable ethylenic monomer to become chemically bonded through carbon thereof to silicon at the active fractured silica surfaces, and separating as the resulting product a modified silica powder having organophilic properties.

4. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and having active fractured silica surfaces, immediately thereafter mixing and intimately contacting said active fractured silica particles with a polymerizable ethylenic monomer in amount by weight equivalent to at least 0.1% carbon and a stabilizer therefor against addition polymerization, at a temperature below that at which polymerization of said monomer occurs, thereby causing said polymerizable ethylenic monomer to become chemically bonded through carbon thereof to silicon at the active fractured silica surfaces, and separating as the resulting product a modified silica powder having organophilic properties.

5. A method for preparing a modified silica powder having organophilic properties which comprises grinding and fracturing a hard, dense silica selected from the class consisting of fused silica and crystalline silica to fine particles within the range of 0.4 to 60 microns weight median diameter and in intimate mixture with a polymerizable ethylenic monomer in amount by weight equivalent to at least 0.1% carbon, at a temperature below that at which polymerization of said monomer occurs, thereby providing active fractured silica surfaces in intimate contact with said polymerizable ethylenic monomer and causing said polymerizable ethylenic monomer to become chemically bonded through carbon thereof to silicon at the active fractured silica surfaces, and separating as the resulting product a modified silica powder having organophilic properties.

6. A method for preparing a modified silica powder having organophilic properties which comprises grinding and fracturing a hard, dense silica selected from the class consisting of fused silica and crystalline silica to fine particles within the range of 0.4 to 60 microns weight median diameter and in intimate mixture with a polymerizable ethylenic monomer in amount by weight equivalent to at least 0.1% carbon and a stabilizer therefor against addition polymerization, at a temperature below that at which polymerization of said monomer occurs, thereby providing active fractured silica surfaces in intimate contact with said polymerizable ethylenic monomer and causing said polymerizable ethylenic monomer to become chemically bonded through carbon thereof to silicon at the active fractured silica surfaces, and separating as the resulting product a modified silica powder having organophilic properties.

7. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and in intimate mixture with a polymerizable ethylenic monomer in amount by weight equivalent to at least 0.1% carbon, at a temperature below that at which polymerization of said monomer occurs, thereby providing active fractured silica surfaces in intimate contact with said polymerizable ethylenic monomer and causing said polymerizable ethylenic monomer to become chemically bonded through carbon thereof to silicon at the active fractured silica surfaces, and separating as the resulting product a modified silica powder having organophilic properties.

8. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and in intimate mixture with a polymerizable ethylenic monomer in amount by weight equivalent to at least 0.1% carbon and a stabilizer therefor against addition polymerization, at a temperature below that at which polymerization of said monomer occurs, thereby providing active fractured silica surfaces in intimate contact with said polymerizable ethylenic monomer and causing said polymerizable ethylenic monomer to become chemically bonded through carbon thereof to silicon at the active fractured silica surfaces, and separating as the resulting product a modified silica powder having organophilic properties.

9. A method for preparing a modified silica powder having organophilic properties which comprises grinding and fracturing a hard, dense silica selected from the class consisting of fused silica and crystalline silica to fine particles within the range of 0.4 to 60 microns weight median diameter and having active fractured silica surfaces, while said silica surfaces are still active mixing and intimately contacting said active fractured silica particles with styrene in amount by weight equivalent to at least 0.1% carbon and at a temperature below that at which polymerization of styrene occurs, thereby causing said styrene to become chemically bonded through carbon thereof to silicon at the active fractured silica surfaces, and separating as the resulting product a modified silica powder having organophilic properties.

10. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and having active fractured silica surfaces, maintaining said active fractured silica surfaces in contact with an inert atmosphere for a period of not more than 260 hours, immediately thereafter mixing and intimately contacting under an inert atmosphere said active fractured silica particles with styrene in amount by weight equivalent to at least 0.1% carbon and at a temperature below that at which polymerization of styrene occurs, thereby causing said styrene to become chemically bonded through carbon thereof to silicon at the active fractured silica surfaces, and separating as the resulting product a modified silica powder having organophilic properties.

11. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and having active fractured silica surfaces, immediately thereafter mixing and intimately contacting said active fractured silica particles with styrene in amount by weight equivalent to at least 0.1% carbon and a stabilizer therefor against addition polymerization, at a temperature below that at which polymerization of styrene occurs, thereby causing said styrene to become chemically bonded through carbon thereof to silicon at the active fractured silica surfaces, and separating as the resulting product a modified silica powder having organophilic properties.

12. A method for preparing a modified silica powder having organophilic properties which comprises grinding and fracturing a hard, dense silica selected from the class consisting of fused silica and crystalline silica to fine particles within the range of 0.4 to 60 microns weight median diameter and in intimate mixture with styrene in amount by weight equivalent to at least 0.1% carbon, at a temperature below that at which polymerization of styrene occurs, thereby providing active fractured silica surfaces in intimate contact with said styrene and causing said styrene to become chemically bonded through carbon thereof at the active fractured silica surfaces, and separating as the resulting product a modified silica powder having organophilic properties.

13. A method for preparing a modified silica powder having organophilic properties which comprises grinding and fracturing a hard, dense silica selected from the class consisting of fused silica and crystalline silica to fine particles within the range of 0.4 to 60 microns weight median diameter and in intimate mixture with styrene in amount by weight equivalent to at least 0.1% carbon and a stabilizer therefor against addition polymerization, at a temperature below that at which polymerization of styrene occurs, thereby providing active fractured silica surfaces in intimate contact with said styrene and causing said styrene to become chemically bonded through carbon thereof to silicon at the active fractured silica surfaces, and separating as the resulting product a modified silica powder having organophilic properties.

14. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and in intimate mixture with styrene in amount by weight equivalent to at least 0.1% carbon, at a temperature below that at which polymerization of styrene occurs, thereby providing active fractured silica surfaces in intimate contact with said styrene and causing said styrene to become chemically bonded through carbon thereof to silicon at the active fractured silica surfaces, and separating as the resulting product a modified silica powder having organophilic properties.

15. A method for preparing a modified silica powder having organophilic properties which comprises grinding and fracturing, under an inert atmosphere, a hard, dense silica selected from the class consisting of fused silica and crystalline silica to fine particles within the range of 0.4 to 60 microns weight median diameter and in intimate mixture with styrene in amount by weight equivalent to at least 0.1% carbon and a stabilizer therefor against addition polymerization, at a temperature below that at which polymerization of styrene occurs, thereby providing active fractured silica surfaces in intimate contact with said styrene and causing said styrene to become chemically bonded through carbon thereof to silicon at the active fractured silica surfaces, and separating as the resulting product a modified silica powder having organophilic properties.

16. A dry modified silica powder having organophilic properties which is the reaction product of a polymerizable ethylenic monomer and fractured hard, dense silica particles within the range of 0.4 to 60 microns weight median diameter selected from the class consisting of fused silica and crystalline silica, said reaction product being obtained by the process of claim 1 and having an organic component, resulting from said polymerizable ethylenic monomer, in amount equivalent to 0.1 to 5% carbon chemically bonded through carbon-silicon bonds to the fractured silica particles.

17. A dry modified silica powder having organophilic properties which is the reaction product of styrene and fractured hard, dense silica particles within the range of 0.4 to 60 microns weight median diameter selected from the class consisting of fused silica and crystalline silica, said reaction product being obtained by the process of claim 9 and having an organic component, resulting from said styrene, in amount equivalent to 0.1 to 5% carbon chemically bonded through carbon-silicon bonds to the fractured silica particles.

18. A method for preparing a modified silica powder having organophilic properties which comprises grinding and fracturing a hard, dense silica selected from the class consisting of fused silica and crystalline silica to fine particles within the range of 0.4 to 60 microns weight median diameter and having active fractured silica surfaces, while said silica surfaces are still active mixing and intimately contacting said active fractured silica particles with a polymerizable ethylenic terminally unsaturated monomer in amount by weight equivalent to at least 0.1% carbon and at a temperature below that at which polymerization of said monomer occurs, thereby causing said polymerizable ethylenic terminally unsaturated monomer to become chemically bonded through carbon thereof to silicon at the active fractured silica surfaces, and separating as the resulting product a modified silica powder having organophilic properties.

19. A method for preparing a modified silica powder having organophilic properties which comprises grinding and fracturing a hard, dense silica selected from the class consisting of fused silica and crystalline silica to fine particles within the range of 0.4 to 60 microns weight median diameter and having active fractured silica surfaces, while said silica surfaces are still active mixing and intimately contacting said active fractured silica particles with a polymerizable ethylenically unsaturated hydrocarbon in amount by weight equivalent to at least 0.1% carbon and at a temperature below that at which polymerization of said ethylenically unsaturated hydrocarbon occurs, thereby causing said polymerizable ethylenically unsaturated hydrocarbon to become chemically bonded through carbon thereof to silicon at the active fractured silica surfaces, and separating as the resulting product a modified silica powder having organophilic properties.

20. A method for preparing a modified silica powder having organophilic properties which comprises grinding and fracturing a hard, dense silica selected from the class consisting of fused silica and crystalline silica to fine particles within the range of 0.4 to 60 microns weight median diameter and having active fractured silica surfaces, while said silica surfaces are still active mixing and intimately contacting said active fractured silica particles with alpha-methylstyrene in amount by weight equivalent to at least 0.1% carbon and at a temperature below that at which polymerization of alpha-methylstyrene occurs, thereby causing said alpha-methylstyrene to become chemically bonded through carbon thereof to silicon at the active fractured silica surfaces, and separating as the resulting product a modified silica powder having organophilic properties.

21. A dry modified silica powder having organophilic properties which is the reaction product of alpha-methylstyrene and fractured hard, dense silica particles within the range of 0.4 to 60 microns weight median diameter selected from the class consisting of fused silica and crystalline silica, said reaction product being obtained by the process of claim 20 and having an organic component, resulting from said alpha-methylstyrene, in amount equivalent to 0.1 to 5% carbon chemically bonded through carbon-silicon bonds to the fractured silica particles.

References Cited in the file of this patent

UNITED STATES PATENTS

| | | |
|---|---|---|
| 2,266,793 | Oppermann | Dec. 23, 1941 |
| 2,300,812 | Rust | Nov. 3, 1942 |
| 2,439,689 | Hyde | Apr. 13, 1948 |
| 2,467,339 | Seymour | Apr. 16, 1949 |
| 2,589,705 | Kistler | Mar. 18, 1952 |

OTHER REFERENCES

Baldwin: Industrial and Engineering Chem., vol. 21, April 1929, pages 326 to 329.

Fischer: Paint and Varnish Technology, Reinbold, 1948, page 39.